United States Patent
Geaghan et al.

(10) Patent No.: US 7,439,963 B2
(45) Date of Patent: Oct. 21, 2008

(54) TOUCH SENSOR WITH LINEARIZED RESPONSE

(75) Inventors: Bernard O. Geaghan, Salem, NH (US); Bulent Bulat, Framingham, MA (US); Kenneth J. Keefer, Westford, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 11/927,219

(22) Filed: Oct. 29, 2007

(65) Prior Publication Data

US 2008/0041641 A1 Feb. 21, 2008

Related U.S. Application Data

(62) Division of application No. 10/748,573, filed on Dec. 30, 2003, now Pat. No. 7,307,624.

(51) Int. Cl.
*G06F 3/041* (2006.01)
(52) U.S. Cl. .................................. 345/173; 345/156
(58) Field of Classification Search ......... 345/173–179, 345/156
See application file for complete search history.

(56) References Cited

U.S. PATENT DOCUMENTS

| | | | |
|---|---|---|---|
| 4,198,539 A | 4/1980 | Pepper, Jr. | |
| 4,293,734 A | 10/1981 | Pepper, Jr. | |
| 4,371,746 A | 2/1983 | Pepper, Jr. | |
| 4,731,508 A * | 3/1988 | Gibson et al. | 178/18.05 |
| 4,797,514 A | 1/1989 | Talmage, Jr. et al. | |
| 4,822,957 A * | 4/1989 | Talmage et al. | 178/18.05 |
| 5,041,701 A * | 8/1991 | Wolfe et al. | 178/18.05 |
| 5,045,644 A * | 9/1991 | Dunthorn | 178/18.05 |
| 5,220,136 A | 6/1993 | Kent | |
| 5,736,688 A * | 4/1998 | Barrett et al. | 178/18.05 |
| 5,804,773 A | 9/1998 | Wilson et al. | |
| 5,815,141 A * | 9/1998 | Phares | 345/173 |
| 5,869,791 A | 2/1999 | Young | |
| 5,886,687 A * | 3/1999 | Gibson | 345/173 |
| 5,915,285 A * | 6/1999 | Sommer | 73/865.7 |
| 5,940,065 A * | 8/1999 | Babb et al. | 345/178 |
| 6,163,313 A * | 12/2000 | Aroyan et al. | 345/173 |
| 6,506,983 B1 * | 1/2003 | Babb et al. | 178/18.01 |
| 6,549,193 B1 * | 4/2003 | Huang et al. | 345/173 |

(Continued)

FOREIGN PATENT DOCUMENTS

EP 1 172 831 1/2002

*Primary Examiner*—Ricardo L Osorio
(74) *Attorney, Agent, or Firm*—Steven A. Bern (57) ABSTRACT

A field linearization pattern and a touch sensor incorporating same are disclosed. The touch sensor includes a polygonal field linearization pattern disposed around a touch sensitive area. The field linearization pattern includes a first side and a second side that intersect at a first corner. The field linearization pattern further includes an inner row and an outer row of discrete conductive segments. The inner row includes a conductive corner segment at the first corner. The conductive corner segment extends along a portion of the first and second sides of the linearization pattern. The touch sensor further includes electronics configured to detect a location of an input touch applied to the touch sensitive area by generating an electrical current in the linearization pattern. A current flowing from the first side to the second side of the linearization pattern is substantially confined within the linearization pattern.

19 Claims, 7 Drawing Sheets

U.S. PATENT DOCUMENTS

| | | | |
|---|---|---|---|
| 6,559,835 B1 * | 5/2003 | Randall | 345/173 |
| 6,593,916 B1 * | 7/2003 | Aroyan | 345/173 |
| 6,762,752 B2 * | 7/2004 | Perski et al. | 345/173 |
| 6,781,579 B2 * | 8/2004 | Huang et al. | 345/173 |
| 7,075,522 B2 * | 7/2006 | Han | 345/173 |
| 7,148,881 B2 * | 12/2006 | Lee et al. | 345/173 |
| 2001/0036504 A1 * | 11/2001 | Bottari et al. | 427/162 |
| 2003/0230438 A1 * | 12/2003 | Keefer et al. | 178/18.05 |
| 2003/0231169 A1 | 12/2003 | Aroyan et al. | |
| 2004/0217945 A1 * | 11/2004 | Miyamoto et al. | 345/173 |
| 2005/0184965 A1 | 8/2005 | Geaghan et al. | |

* cited by examiner

TOUCH SENSOR WITH LINEARIZED RESPONSE

This application is a divisional application of U.S. patent application Ser. No. 10/748,573, filed Dec. 30, 2003 now U.S. Pat. No. 7,307,624, now allowed.

FIELD OF THE INVENTION

This invention generally relates to linearizing an electric field on an electrically resistive film. The invention is particularly applicable to linearizing an electric field in a touch sensitive area of a touch panel by forming an electrode pattern around a perimeter of the touch sensitive area.

BACKGROUND

Touch screens allow a user to conveniently interface with an electronic display system. For example, a user can carry out a complicated sequence of instructions by simply touching the screen at a location identified by a pre-programmed icon. The on-screen menu may be changed by re-programming the supporting software according to the application.

Resistive and capacitive are two common touch sensing methods employed to detect the location of a touch input. Resistive technology typically incorporates two resistive films as part of an electronic circuit that detects the location of a touch. Capacitive technology, on the other hand, typically uses a single resistive film to detect the location of an applied touch.

A touch location is generally determined by applying an electric field to a resistive film in the touch sensitive area. Where the transparent conductor is an electrically continuous coating in the touch area, the accuracy of detecting the location of an applied touch depends on the linearity of the electric field in the transparent conductor.

Various methods have been proposed to linearize the electric field. For example, in a four wire resistive touch technology, a pair of highly conductive continuous electrode bars are formed onto a resistive film at two opposite edges of a touch sensitive surface. A differential voltage applied to the two conductive bars results in a fairly linear electric field in the plane of the resistive film in the direction normal to the two electrode bars. Similarly, a second pair of highly conductive electrode bars are formed on a second resistive film with the bars being orthogonal to the first pair of bars.

As another example, five wire resistive or capacitive touch sensors typically employ an electrode pattern along the perimeter of a touch sensitive area to linearize the field. In a five wire resistive touch sensor, a second transparent conductor typically acts as a current sink or voltage probe and does not require linearization. In a five wire capacitive touch sensor, a user's finger or other conductive implement may provide the current sink. The electrode pattern is typically made up of a number of discrete conductive segments positioned in such a way as to generate a linear orthogonal field in the plane of the transparent resistive film.

Typically, the linearizing electrode pattern includes several rows of discrete conductive segments positioned along the perimeter of a touch sensitive area, such as disclosed in U.S. Pat. Nos. 4,198,539; 4,293,734; and 4,371,746. The conductive segments are typically electrically connected to each other via a resistive film they are deposited on. U.S. Pat. No. 4,822,957 discloses rows of discrete electrodes having varying lengths and spacings to linearize the electric field in a touch area.

Several factors can determine the efficacy of a linearization pattern. One such factor is the degree to which the field can be linearized. Some electrode patterns may be incapable of linearizing the field to a level required in a given application.

Another factor is the end-to-end resistance of an electrode pattern, which can be measured, for example, in a rectangular electrode pattern, by applying a voltage to the two corners of one edge of the pattern, and applying a different voltage to the two corners of the opposite edge, and measuring the current that flows between the two edges. A lower value of end-to-end resistance in an electrode pattern typically yields better linearity. A lower end-to-end resistance, however, can increase signal drive requirements and may reduce device sensitivity. Accordingly, a high end-to-end resistance is often desirable when designing an electrode pattern.

Another factor is sensitivity of field linearity to small variations in the electrode pattern. Such variations are typically unavoidable during manufacturing. If small variations in the electrode pattern result in unacceptable nonlinearity in the electric field, the yield and hence the cost of manufacturing a touch sensor may be adversely affected.

SUMMARY OF THE INVENTION

Generally, the present invention relates to linearizing an electric field in an electrically resistive film. The present invention also relates to linearizing an electric field in a touch sensitive area of a touch panel.

In one aspect of the invention, a touch sensor includes a resistive film covering a touch sensitive area. The touch sensor further includes at least two polygonal parallel rows of discrete conductive segments disposed on the resistive film and surrounding the touch sensitive area. Each edge of each row includes one or more middle conductive segments disposed between two end conductive segments. The end conductive segments at each polygon vertex in the outermost row are disjoined in the outermost row. The end conductive segments at each polygon vertex in at least one inner row are joined in the inner row. The touch sensor further includes electrically conductive interconnect lines connected to each of the end conductive segments in the outermost row for communicating signals to and from the resistive film for detecting an input touch applied to the touch sensitive area.

In another aspect of the invention, a touch sensor includes a resistive film that covers a touch sensitive area. The touch sensor further includes two polygonal parallel rows that surround the touch sensitive area including an inner row and an outermost row. The inner row includes an electrically insulative corner segment in the resistive film at each vertex of the inner row. The outermost row includes an electrically conductive corner segment disposed on the resistive film at each vertex of the outermost row. Each corner segment at a polygon vertex extends along a portion of each of the two edges intersecting at the polygon vertex. The touch sensor further includes electrically conductive interconnect lines that are connected to the conductive corner segments for communicating signals to and from the resistive film for detecting an input touch applied to the touch sensitive area.

In another aspect of the invention, a touch sensor includes a resistive film that covers a touch sensitive area. The touch sensor further includes at least one polygonal parallel row of discrete conductive segments disposed on the resistive film and surrounding the touch sensitive area. Each edge of each row includes one or more middle conductive segments disposed between two end conductive segments. The end conductive segments at a first vertex in the outermost row are joined at the first vertex to form a conductive corner segment.

The touch sensor further includes an electrically insulative segment in the resistive film positioned along and oriented inward of the outermost row and proximate the first vertex. The insulating segment partially extends parallel to each of the two sides of the outermost row that intersect at the first vertex.

In another aspect of the invention, an article includes an electrically resistive film. The article further includes two polygonal parallel rows of discrete conductive segments disposed on the resistive film. Each row has a conductive corner segment at a same vertex of the polygon. Each corner segment extends along a portion of each of the two edges that intersect at the vertex. The article further includes an electrically insulative region between the two corner segments.

In another aspect of the invention, a touch sensor includes a polygonal field linearization pattern disposed around a touch sensitive area. The field linearization pattern includes a first side and a second side that intersect at a first corner. The field linearization pattern further includes an inner row and an outer row of discrete conductive segments. The inner row includes a conductive corner segment at the first corner. The conductive corner segment extends along a portion of the first and second sides of the linearization pattern. The touch sensor further includes electronics configured to detect a location of an input touch applied to the touch sensitive area by generating an electrical current in the linearization pattern. A current flowing from the first side to the second side of the linearization pattern is substantially confined within the linearization pattern.

BRIEF DESCRIPTION OF DRAWINGS

The invention may be more completely understood and appreciated in consideration of the following detailed description of various embodiments of the invention in connection with the accompanying drawings, in which.

Unless otherwise indicated all figures and drawings in this document are schematic, dimensions are not to scale, and are chosen for the purpose of illustrating different embodiments of the invention. Furthermore, in describing the different embodiments of the invention, position of elements is sometimes described in terms of "top", "bottom", "left", and "right." These terms are used merely to simplify the illustration of different elements of the invention, such as those illustrated in drawings. They should not be understood to place any limitations on the useful orientation of the elements of the present invention.

DETAILED DESCRIPTION

The present invention generally relates to linearizing an electric field in an electrically resistive film by forming an electrode pattern onto the resistive film. The invention is particularly applicable to touch sensors employing an electrode pattern for linearizing the electric field in a touch sensitive area in order to more accurately determine the location of an applied touch.

A touch screen functions on the general principle that an otherwise open electrical circuit is closed when a touch is applied. The properties of a signal generated in the closed circuit allows detection of a touch location. Various technologies may be employed to detect a touch location. One such technology is resistive. In a resistive touch, an applied touch brings two otherwise physically separated resistive films into direct physical contact with one another. The physical contact closes an otherwise open electronic circuit, thereby resulting in generation of a resistively coupled electrical signal. The properties of the generated signal allow detection of the touch location.

Capacitive is another technology commonly used to detect location of a touch. In this case, a signal is generated when a conductive touch implement, such as a user's finger or a conductive stylus, is brought sufficiently close to a resistive film to allow capacitive coupling between the two conductors. Properties of the generated signal allow detection of the touch location.

The present invention is particularly applicable to touch screens utilizing resistive or capacitive technologies where an electric field is linearized in one or more directions in a plane of an electrically resistive film in a touch sensitive area. U.S. Pat. Nos. 4,198,539; 4,293,734; 4,371,746; and 4,822,957 disclose linearizing electrode patterns disposed on a perimeter of a touch sensitive area. Commonly owned U.S. patent application Ser. No. 09/169,391 discloses electrode patterns for improving linearity of a touch panel. The electrode patterns disclosed in U.S. Ser. No. 09/169,391 include rows of conductive segments disposed on the border of a resistive layer where every row has at least two conductive segments, each of which faces at least a portion of three conductive segments in an adjacent row.

The present invention describes a linearization pattern for linearizing an electric field, for example, in a touch sensitive area of a touch sensor. The linearization pattern can be a polygon, having a plurality of sides, where each two adjacent sides intersect at a polygon vertex. The linearization pattern can be disposed around the touch sensitive area of the touch sensor. According to one embodiment of the invention, an electrical current flowing between two adjacent sides of the linearization pattern is substantially confined within the linearization pattern, resulting in improved field linearity. As such, only a very small portion of any current flowing between adjacent sides of the linearization pattern flows through the touch sensitive area.

The polygonal linearization pattern can include multiple rows of discrete conductive segments, where each row can have the same polygonal shape, and where the rows can be substantially parallel to each other. Each row of the linearization pattern can include a plurality of discrete conductive segments. Furthermore, each row of the linearization pattern has a plurality of edges, where each two adjacent edges of the row intersect at a row vertex. According to one embodiment of the invention, an inner row of the linearization pattern can have a conductive corner segment at a vertex of the inner row, where the conductive corner segment extends along a portion of each of the two adjacent edges that intersect at the vertex.

Figure 1:
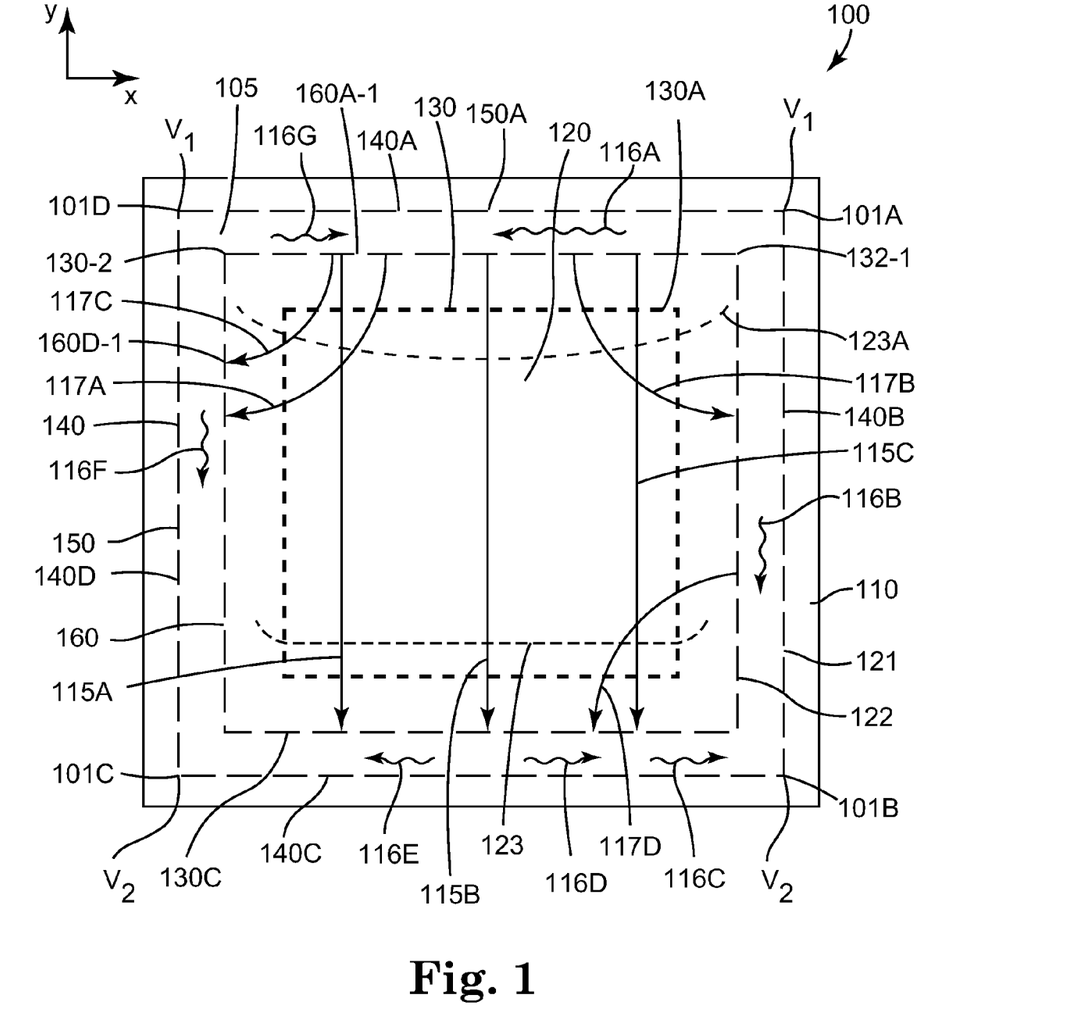
FIG. 1 illustrates a schematic top-view of a touch sensor.

FIG. 1 illustrates a schematic top view of a touch panel 100. Touch panel 100 includes a resistive film 110 that covers a touch sensitive area 120. Touch sensitive area 120 is defined by a perimeter 130. Touch panel 100 further includes a linearization pattern 140 disposed on resistive film 110 surrounding touch sensitive area 120. Linearization pattern 140 can have a polygonal shape, where the polygon has a plurality of sides with adjacent sides intersecting at a polygon vertex and forming a corner. The sides of the linearization pattern may be straight or curved. Furthermore, the corners of the linearization pattern can be rounded off. Linearization pattern 140 includes multiple rows of discrete conductive segments which are in electrical contact with resistive film 110, where the rows can be substantially parallel to each other. For example, FIG. 1 illustrates a first row of conductive segments 140 and a second row of conductive segments 160. Each row includes discrete conductive segments, such as a discrete conductive segment 121 in first row 150 and a discrete conductive segment 122 in second row 160. Each row of the linearization pattern has a plurality of edges. Adjacent edges in a row intersect at a row vertex forming a corner, where the corner can be rounded off. Furthermore, each edge of each row can be straight or curved.

In a resistive touch screen, touch sensitive area 120 is typically activated by applying a differential signal across the touch sensitive area. Such signal can be applied, for example, by applying a voltage $V_1$ to top corners 101A and 101D of the touch sensor, and a different voltage $V_2$ to bottom corners 101B and 101C of the touch panel, resulting in a differential voltage, $\Delta V$, of $V_1$-$V_2$ being applied across the touch panel. As an example, and without loss of generality, $V_2$ is assumed to be less than $V_1$. $V_2$ is often a ground potential, typically zero volts, although $V_2$ can be a different potential. $V_1$ can be any voltage suitably available for use in a touch sensor, generally 10 volts or less, although other voltages can be used.

In contrast, in a capacitive touch screen, touch sensitive area 120 is typically activated by applying a same signal, such as a same voltage signal, to the four corners 101A-101D as disclosed in U.S. Pat. No. 4,293,734. In general, a touch input applied to touch sensitive area 120 results in a flow of current through the four corners and a voltage differential across the touch sensitive area. Without loss of generality and for ease of illustration, the principles regarding voltage differentials, current flows, and linearization of an electric field are illustrated for a voltage differential applied across the touch sensitive area.

Referring back to FIG. 1, the differential voltage $\Delta V$, applied across touch panel 100, can result in a flow of an electrical current through touch sensitive area 120. The applied differential voltage can also result in a voltage gradient across touch sensitive area 120. Preferably, the differential voltage results in a linear field in touch sensitive area 120, meaning that equipotential lines are straight and are preferably oriented along the x-axis. An example of such an equipotential line is dashed line 123 in FIG. 1. By definition, all points on line 123 have the same potential, some voltage in the range from $V_1$ to $V_2$. Line 123 is preferably straight and substantially parallel to the x-axis within touch sensitive area 120. Accordingly, exemplary current flow lines 115A, 115B and 115C, in touch sensitive area 120, are normal to line 123 and parallel to the y-axis. Under such conditions, any current flowing in touch sensitive area 120 flows from top-side 140A of linearization pattern 140 to bottom-side 140C of linearization pattern 140. Accordingly, top-side 140A and bottom-side 140C may be viewed as current source and sink, respectively, for current flowing through touch sensitive area 120.

Furthermore, the voltage gradients along sides 140B and 140D of linearization pattern 140 preferably match the voltage gradient in touch sensitive area 120. In such a case, equipotential lines, such as equipotential line 123, remain straight outside touch sensitive area 120 (not shown in FIG. 1). As such, diagonal currents, such as current 117A and 117D, are eliminated or substantially reduced even outside touch sensitive area 120. Accordingly, touch sensitive area 120 can be expanded.

In known linearization patterns, current flowing through touch sensitive area 120 often has a component that flows along the x-axis, as illustrated by current lines 117A, 117B, 117C and 117D, resulting in a nonlinear current and electric field. Such non-linear current exists particularly near the perimeter 130 of touch sensitive area 120, and even more particularly, near the corners of the touch sensitive area 120. Current nonlinearity close to top corners of the touch sensitive area results in a bowing of equipotential lines near the top-edge 130A and bottom-edge 130C of touch sensitive area 120. One such equipotential line is dashed line 123A in FIG. 1.

According to one embodiment of the invention, field linearity in a touch sensitive area is improved by reducing the potential at the top corners 130-1 and 130-2 of touch sensitive area 120 relative to the potential at a top middle 130-3 of the touch sensitive area by, for example, reducing the resistance of a resistive path at a corner of linearization pattern 140 where the resistive path lies within the linearization pattern.

Currents flowing within top-side 140A of linearization pattern 140 culminate in currents flowing through the touch sensitive area. For example, currents 116A and 116G primarily flow within and along top-side 140A and give rise to, for example, currents 115A, 115B and 115C in touch sensitive area 120. Similarly, currents flowing in touch sensitive area 120 terminate in currents that flow primarily along and within bottom-side 140C of linearization pattern 140. For example, currents 115A, 115B and 115C give rise to currents 116C, 116D and 116E flowing primarily along and within bottom-side 140C.

Furthermore, according to one embodiment of the invention, any current flowing within left and right sides of linearization pattern 140 are primarily confined within the linearization pattern. For example, currents 116B and 116F flow along the y-axis and are substantially confined within the right and left sides of linearization pattern 140, respectively. Such confinement can improve field linearity, especially along the perimeter of the touch sensitive area, and even more particularly at the corners of the touch sensitive area.

According to one embodiment of the invention, a path connecting two conductive segments on either side of a corner of a linearization pattern is more resistive for a path through touch sensitive area 120 than a path lying within linearization pattern 140. As such, more of a current flowing between the two conductive segments flows within the linearization pattern than through the touch sensitive area, resulting in improved field linearity.

Figure 2:
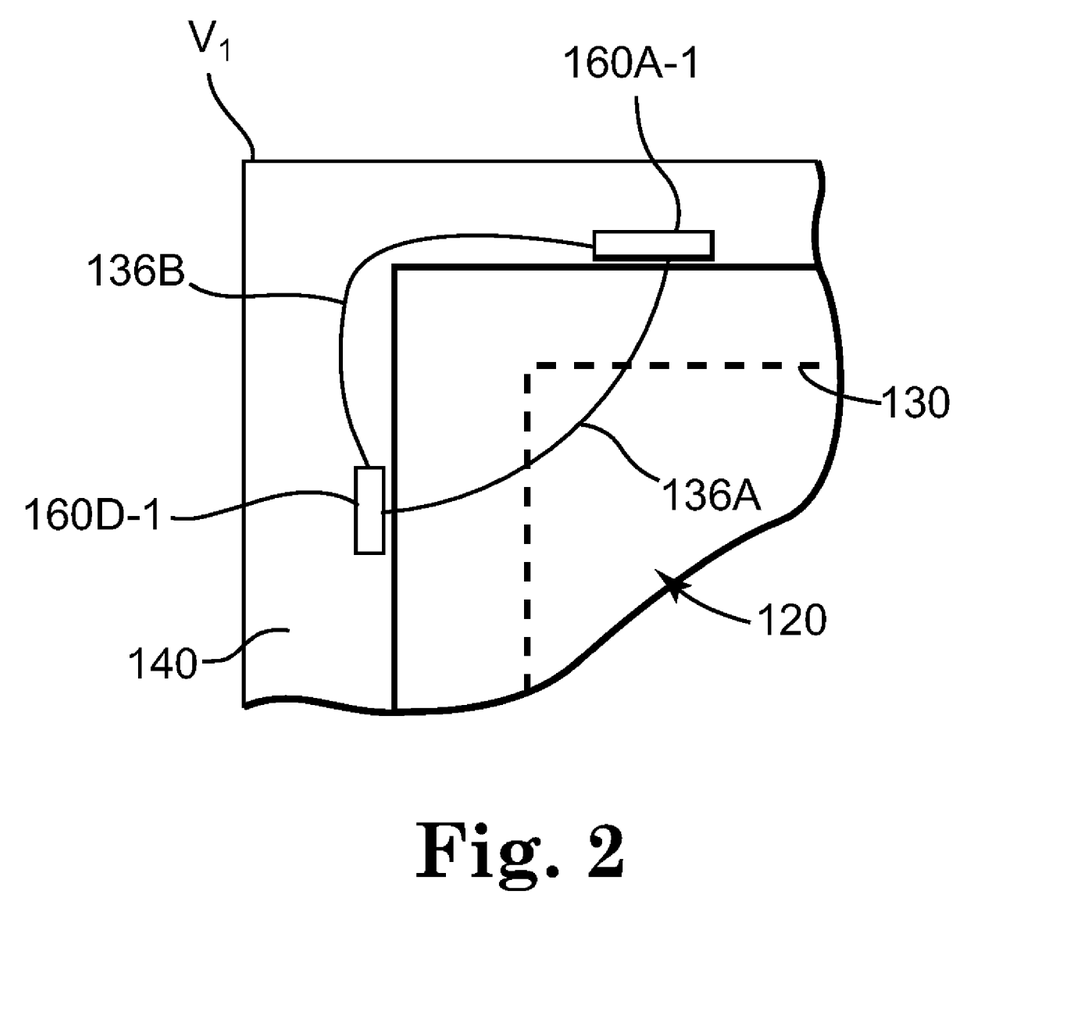
FIG. 2 illustrates a schematic top-view of two resistive paths between two discrete conductive segments of a linearization pattern.

For example, FIG. 2 illustrates two resistive paths 136A and 136B between two conductive segments 160A-1 and 160D-1, where the two conductive segments are two exemplary discrete conductive segments in linearization pattern 140. In particular, resistive element 160D-1 is disposed on the left edge of second row 160 and resistive element 160A-1 is disposed on the top edge of second row 160, where top and left edges of row 160 intersect at vertex 105. Resistive path 136A goes through touch sensitive area 120. Resistive path 136B, on the other hand, lies within linearization pattern 140. According to one embodiment of the invention, path 136A is more resistive than path 136B. Accordingly, most of a current flowing between the two segments 160A-1 and 160D-1 flows along path 136B, and only a small portion of such current flows along path 136A. Therefore, nonlinear currents, such as current 117C are substantially reduced or eliminated.

Figure 3:
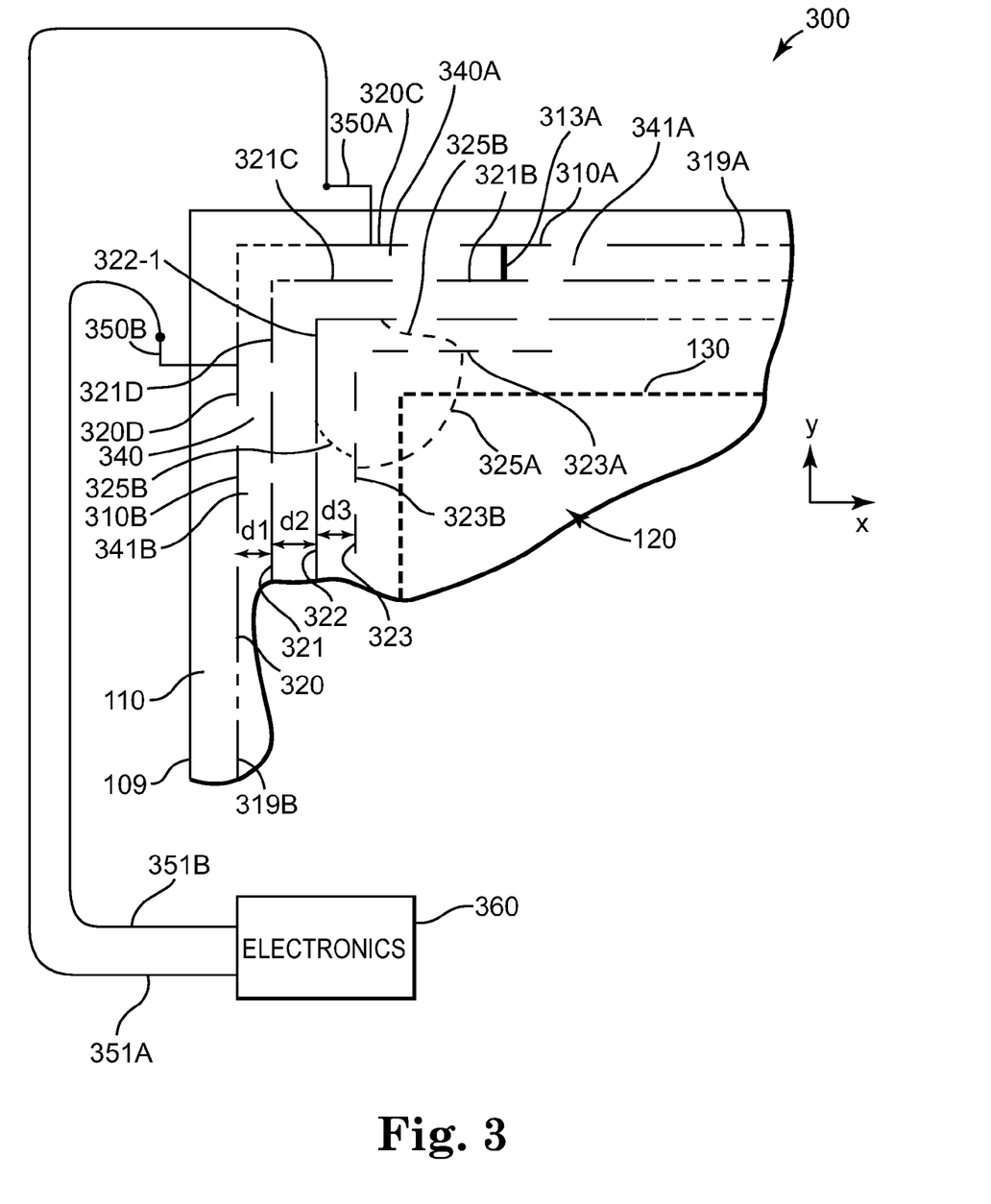
FIG. 3 illustrates a schematic top-view of a portion of a touch sensor in accordance with one embodiment of the invention.

FIG. 3 illustrates a schematic top view of a portion of a touch sensor 300 in accordance with one embodiment of the invention. Touch sensor 300 includes a resistive film 110 that covers a touch sensitive area 120. Touch sensitive area 120 has a perimeter 130. Touch sensor 300 further includes a linearization pattern 340 disposed on resistive film 110. Linearization pattern 340 surrounds touch sensitive area 120. Linearization pattern 340 is a polygon and has multiple sides, with every two adjacent sides intersecting at a vertex. For example, sides 341A and 341B of linearization pattern intersect at vertex 350. Linearization pattern 340 includes multiple polygonal rows of discrete conductive segments. In particular, FIG. 3 shows a first row of discrete conductive segments 320, a second row of discrete conductive segments 321, a third row of discrete conductive segments 322, and a fourth row of discrete conductive segments 323. First row 320 is also the outermost row of linearization pattern 340. Each of rows 321, 322 and 323 is an inner row of linearization pattern 340. Furthermore, row 323 is also the innermost row of linearization pattern 340. Each row of linearization pattern 340 includes multiple edges, with every two adjacent edges in a row intersecting at a vertex. For example, adjacent edges 319A and 319B of row 320 intersect at vertex 350. For convention, for any two given rows, the row that is closer to perimeter 109 of resistive film 110 is referred to as an outer row, and the row that is farther from perimeter 109 is referred to as an inner row. The outermost and innermost rows refer to the rows closest to and farthest from perimeter 109, respectively.

The polygon may be any polygonal shape, generally a square, a rectangle, or a triangle. Edges of linearization pattern 340 may be straight or curved. For example, edges of linearization pattern 340 may bow inward or outward in an arc along each edge.

According to one embodiment of the invention, each edge of each row of linearization pattern 340 includes one or more middle conductive segments disposed between two end conductive segments. For example, conductive segments 310A and 310B are two middle conductive segments in outermost row 320. As another example, conductive segments 320C and 320D are two end conductive segments of outermost row 320 near vertex 350.

According to one embodiment of the invention, end conductive segments at each polygon vertex in the outermost row are not joined in the outermost row 320. For example, end conductive segments 320C and 320D at vertex 350 are not joined, meaning that conductive segments do not contact each other, although the end segments may be electrically connected through other means such as resistive film 110. As another example, end conductive segments 321C and 321D of row 321 and at vertex 350 are disjoined in row 321, meaning that the end conductive segments do not physically touch one another, although they may be electrically connected through, for example, resistive film 110.

According to one embodiment of the invention, end conductive segments at each polygon vertex in an inner row are joined in the inner row. For example, end conductive segments 322C and 322D of row 322 and at vertex 350 are joined in inner row 322, meaning that the end segments make physical contact with one another in row 322. In this particular example, end conductive segments 322C and 322D are joined at vertex 350 to form a conductive corner segment 322-1.

According to one embodiment of the invention, one or more segments in a given row are connected to one or more segments in an adjacent row via one or more conductive bars. For example, referring to FIG. 3, conductive segment 310A in row 320 is connected to conductive segment 321B in row 321 via a conductive bar 313A. Conductive bar 313A is preferably made of the same material as the conductive segments. Conductive bars preferably have substantially the same sheet resistance as the conductive segments, although, in some embodiments of the present invention, some or all conductive bars can be made of a material and/or have sheet resistance that is different than those of some or all of conductive segments.

According to one embodiment of the invention, the number of conductive segments in a given row may be odd or even. Furthermore, the number of conductive segments in a given edge of a given row may be odd or even. Furthermore, the separation between a pair of adjacent rows need not be equal to the separation between another pair of adjacent rows. For example, referring to FIG. 3, $d_1$, separation between rows 320 and 321; $d_2$, separation between rows 321 and 322; and $d_3$, separation between rows 322 and 323; need not be equal, although in some embodiments of the invention, $d_1$, $d_2$ and $d_3$ may be substantially equal.

Touch sensor 300 further includes electrically conductive interconnect lines for electrically connecting end conductive segments in the outermost row to electronics 360. For example, FIG. 3 shows an electrically conductive interconnect line 350A connected to end conductive segment 320C, and an electrically conductive interconnect line 350A connected to end conductive segment 320D. Interconnect lines are typically made from the same material as conductive segments, for example, a silver frit or paste, and they are typically applied in the same process, for example, by screen printing. Interconnect lines are distinct from conductive segments in that, except for their direct connection to the end conductive segments, such as end conductive segments 320C and 320D, they are preferably electrically isolated from linearization pattern 340 and resistive film 110 in touch sensitive area 120. Furthermore, the interconnect lines are primarily designed to transmit electrical signal between linearization pattern 340 and electronics 360 and, as such, they preferably do not directly affect field linearity. Electronics 360 detects location of an input touch applied to touch sensitive area 120 by activating touch sensitive area 120, for example, by applying one or more signals to one or more conductive segments in the polygonal parallel rows of discrete conductive segments included in linearization pattern 340. For example, electronics 360 may activate touch sensitive area 120 by applying an electrical signal, such as a voltage $V_1$, to electrically conductive interconnect lines 350A and 350B. Electrically conductive leads 351A and 351B electrically connect electronics 360 to interconnect lines 350A and 350B, respectively. Similar connections may be made at other corners of touch sensor 300 not shown in FIG. 3.

An advantage of touch sensor 300 is improved field uniformity, which can be described in reference to, for example, discrete conductive segments 323A and 323B in innermost row 323. Conductive segments 323A and 323B are electrically connected via different resistive paths. One such path is schematically shown by dashed line 325A. Path 325A electrically connects conductive segments 323A and 323B through touch sensitive area 120. Any current flowing between conductive segments 323A and 323B along path 325A can contribute to field nonlinearity in touch sensitive area 120, especially near the corners of the touch sensitive area, for example, the corner at vertex 350. Another path that electrically connects conductive segments 323A and 323B is path 325B which includes at least a portion of resistive corner segment 322-1. The electrical resistance of corner segment 322-1 is preferably much less than the resistance of a resistive path through resistive film 110. Accordingly, path 325B is preferably substantially more conductive than path 325A. Under such conditions, most of any electrical current that may flow between conductive segments 323A and 323B, flows along path 325B, and only a small, preferably an insignificant, electrical current flows between the two segments along path 325A, resulting in a linear or more linear electric field in touch sensitive area 120. Therefore, a flow of any current from a conductive segment located on side 341A of linearization pattern 340, such as segment 323A, into touch sensitive area 120 will be substantially along the y-axis (such as current 117C of FIG. 1), resulting in a linear field in the touch sensitive area.

According to one embodiment of the invention, conductive corner segment 322-1 improves field linearity in touch sensitive area 120 by matching the voltage gradient along edge 341B of innermost row 323 of linearization pattern 340 with equipotential lines in touch sensitive area 120. This matching of voltage gradients is accomplished because conductive corner segment 322-1 provides a resistive path along linearization pattern 340 and around vertex 350 that is more conductive than any resistive path that goes through touch sensitive area 120.

Resistive film 110 can be made of a semiconductor, doped semiconductor, semi-metal, metal oxide, an organic conductor, a conductive polymer, or the like. Exemplary inorganic materials include conductive oxides, for example indium tin oxide (ITO), tin antimony oxide (TAO), and the like. Exemplary organic materials include carbon filled inks, and conductive polymers such as polypyrrole, polyaniline, polyacetylene, and polythiophene, such as those disclosed in European Patent Publication EP-1-172-831-A2.

The conductive segments can include a metal such as silver, gold, copper, aluminum, lead, and the like, or a combination of metals. The conductive segments can include carbon or other additives to make the segments conductive or more conductive. The conductive segments can be deposited onto the resistive film using ink jet printing, screen printing, or any other suitable method for depositing the conductive segments onto the resistive film. The conductive segments can be patterned using photolithography, ink jet printing, or any other suitable patterning method.

According to one embodiment of the invention, different conductive segments can have different sheet resistance or overall electrical conductivity. For example, the conductive segments in an outer row can be more conductive than the conductive segments in an inner row. As another example, for a given edge in a given row, the end segments can be more conductive than the middle segments. In general, a conductive segment can be made more conductive by increasing its width, thickness, or by using a more conductive material to make the segment.

For the purposes of this invention, field linearity is defined in terms of the departure of the field from a linear electric field. Field linearity can further be defined in terms of linearity of equipotential lines, especially near the linearization pattern. The electric field in touch sensitive area 120 is preferably linearized to within 3%, more preferably to within 2%, even more preferably to within 1%.

According to one embodiment of the invention, touch sensitive area 120 can be activated by applying different magnitude signals, such as voltages, to different conductive segments of linearization pattern 340. For example, for a rectangular electrode pattern, touch sensitive area 120 can be activated by applying a signal, such as a voltage $V_1$, to two end conductive segments along one side of linearization pattern 340, and a different signal, such as a voltage $V_2$, to two end conductive segments along an opposing side of linearization pattern 340. As another example, for a triangular linearization pattern, touch sensitive area 120 can be activated by applying a first signal, such as a voltage $V_a$, to one or more conductive segments along a first side of the triangular linearization pattern, a second signal, such as a voltage $V_b$, to one or more conductive segments along a second side of the triangular linearization pattern, and a third signal, such as a voltage $V_c$, to one or more conductive segments along a third side of the triangular linearization pattern, where the three signals, such as voltages $V_a$, $V_b$, and $V_c$, can be different in magnitude or phase, although in some cases, such as a capacitive touch sensor 300, voltages $V_a$, $V_b$, and $V_c$ can have the same magnitude and phase.

Interconnect lines 350A and 350B may be external wires connected to discrete segments 320C and 320D, respectively. Interconnect lines 350A and 350B may be conductive electrodes disposed on resistive film 110, for example, along the perimeter of the resistive film. Interconnect lines are primarily designed to transmit a signal between electronics 360 and linearization pattern 340 via end conductive segments 320C and 320D. As such, the interconnect lines are preferably isolated from touch sensitive area 120, meaning that end conductive segments 320C and 320D provide the primary electrical connection between the interconnect lines and the resistive surface in the touch sensitive area. An example of a layout of an interconnect line is illustrated in FIG. 4.

Figure 4:
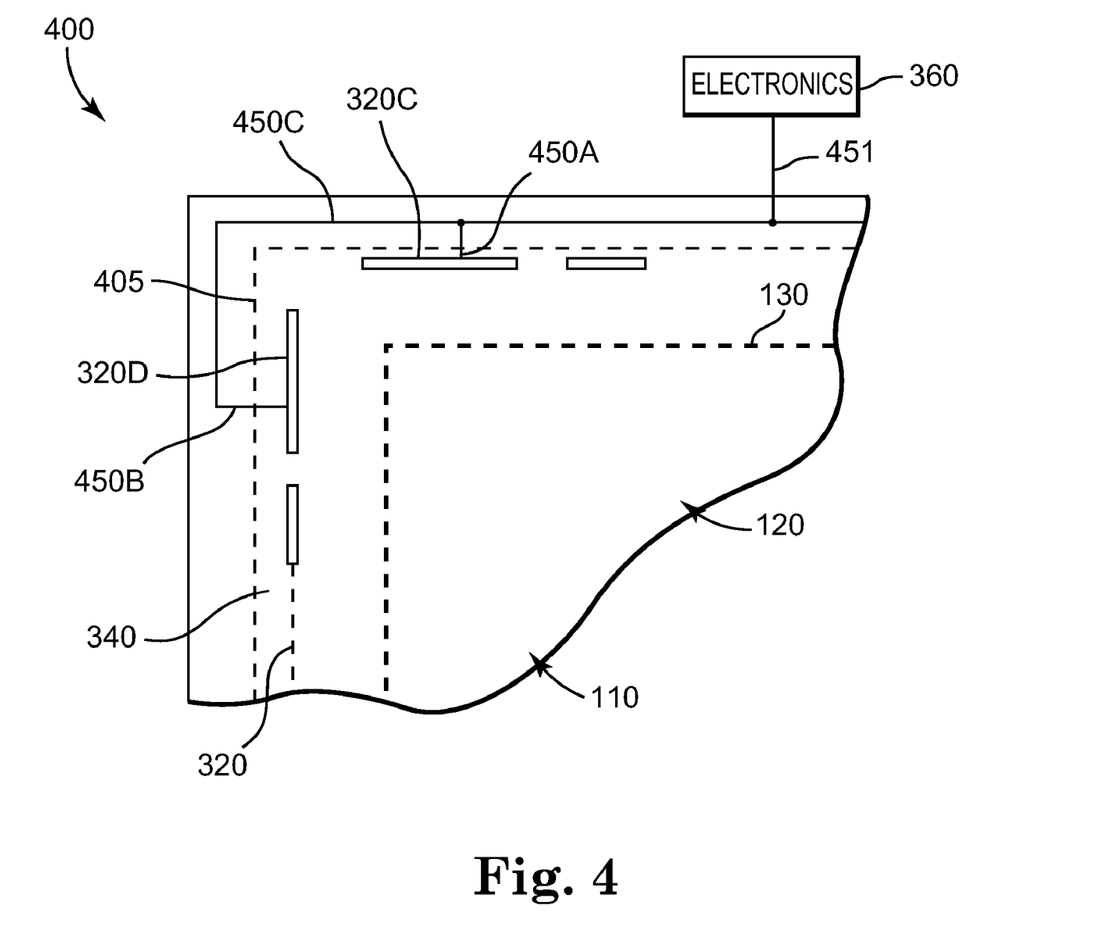
FIG. 4 illustrates a schematic top-view of a portion of a touch sensor in accordance with another embodiment of the invention.

FIG. 4 illustrates a schematic top-view of a portion of a touch sensor 400 in accordance with one particular embodiment of the invention. For ease of illustration and without loss of generality, some of the elements or components shown in FIG. 3 are not shown in FIG. 4. Touch sensor 400 includes an electrically conductive interconnect line 450 for electrically connecting end conductive segments 320C and 320D to electronics 360. Interconnect line 450 includes an electrically conductive interconnect line 450A connected to end conductive segment 320C, an electrically conductive interconnect line 450B connected to end conductive segment 320D, and an electrically conductive interconnect line 450C connected to interconnect lines 450A and 450B. Touch sensor 400 further includes an electrically conductive lead 451 connecting electronics 360 to interconnect line 450. Touch sensor 400 further includes an electrically insulative part 405 in resistive film 110 for electrically isolating interconnect line 450 from linearization pattern 340 and resistive surface 110 in touch sensitive area 120. As such, conductive end segments 320C and 320D provide the primary electrical connection between interconnect line 450 and linearization pattern 340 and resistive surface 110 in touch sensitive area 120.

Insulative part 405 may be a void in resistive film 110, meaning that insulative part 405 may be formed by omitting at least a portion of the material forming resistive film 110. Material forming resistive film may be omitted by, for example, laser ablation, chemical or mechanical etching, or by masking part 405 during the application of the material that forms resistive film 110. Interconnect line 450 may be electrically isolated from touch sensitive area 120 by, for example, disposing a layer of electrically insulative material between line 450 and resistive film 110.

Figure 6:
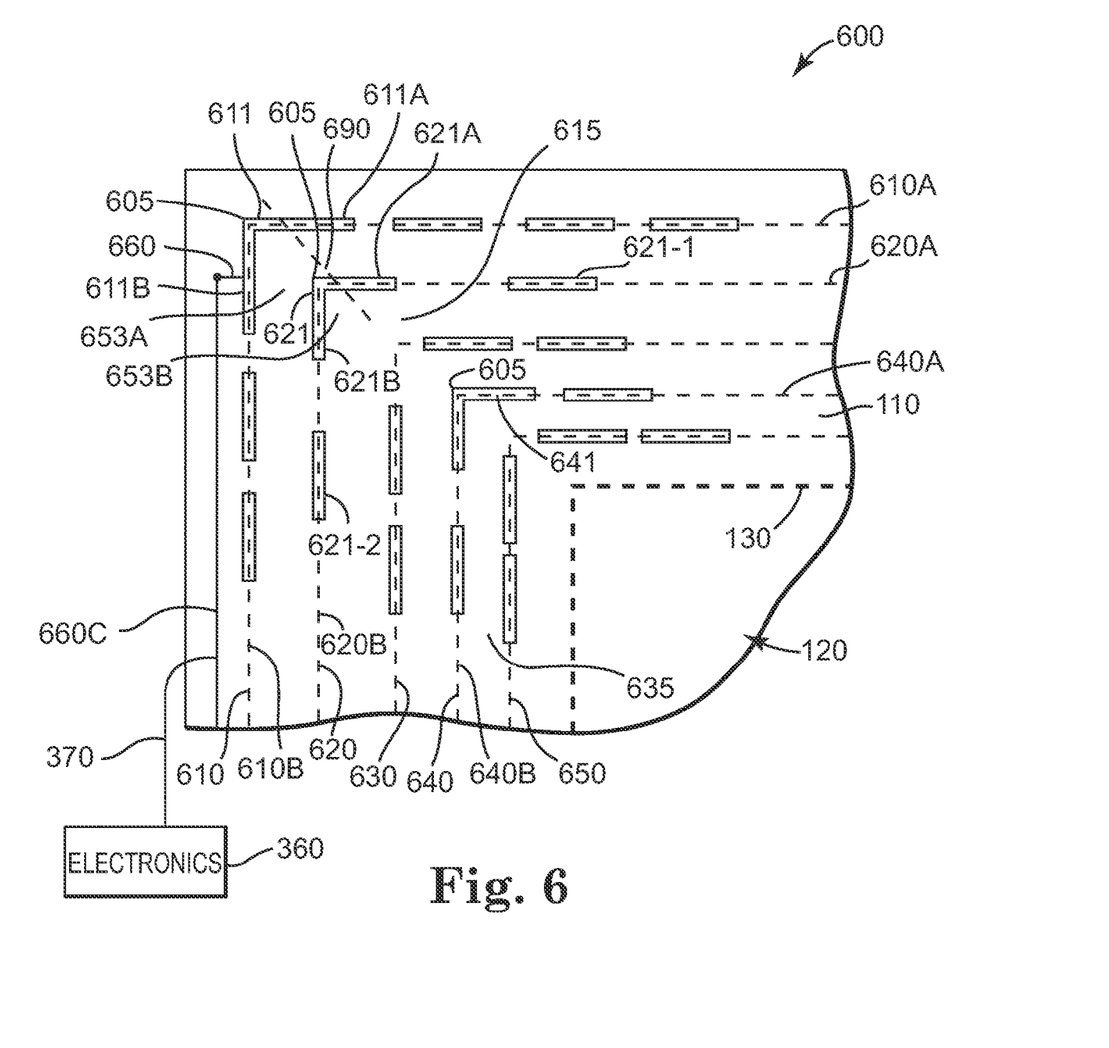
FIG. 6 illustrates a schematic top-view of a portion of a touch sensor in accordance with another embodiment of the invention.

FIG. 6 illustrates a schematic top-view of a portion of a touch sensor 600 in accordance with another embodiment of the invention. Touch sensor 600 includes a linearization pattern 635 that surrounds a touch sensitive area 120. Line 130 defines the perimeter of touch sensitive area. In general, linearization pattern 635 includes at least two polygonal rows of discrete segments. In particular, FIG. 6 shows a first row 610, a second row 620, a third row 630, a fourth row 640, and a fifth row 650. Each of rows 620, 630, 640 and 650 is an inner row of linearization pattern 635. Furthermore, row 650 is the innermost row of linearization pattern 635, and row 610 is the outermost of the linearization pattern 635.

According to one embodiment of the invention, outermost row 610 includes a conductive corner segment 611 disposed on resistive film 110 at a corner 615 of row 610. The exemplary conductive corner segment 611 is located at a vertex 605 of row 610. In general, conductive corner segment 611 is positioned at a corner 615 of touch sensor 600. Conductive corner segment 611 is disposed on resistive film 110 and has a first length 611A that extends along a portion of edge 610A of outermost row 610, and a second length 611B that extends along a portion of edge 610B of outermost row 610. In general, conductive corner segment 611 at polygon vertex 605, extends along a portion of each of the two edges 610A and 610B intersecting at polygon vertex 605. First length 611A may be viewed as a conductive end segment in edge 610A. Similarly, second length 611B may be viewed as a conductive end segment in edge 610B. Accordingly, conductive corner segment 611 may be viewed as conductive end segments 611A and 611B being joined at vertex 605. Touch sensor 600 can further include additional conductive corner segments at other corners of outermost row 610. For example, touch sensor 600 can include a conductive corner segment at each vertex of outermost row 610.

There may be additional conductive corner segments in one or more inner rows of touch sensor 600. For example, FIG. 6 shows a conductive corner segment 641 positioned at a corner 615 of touch sensor 600. In particular, conductive corner segment 641 is located at vertex 605 of fourth row 640 and extends along a portion of each of the two edges 640A and 640B that intersect at polygon vertex 605.

Touch sensor 600 further includes an insulative corner segment 621 in resistive film 110. Insulative corner segment 621 may be a omission in resistive film 110, meaning that insulating part 621 may be formed by omitting at least a portion of the material forming resistive film 110. Material forming resistive film may be omitted by, for example, laser ablation, photolithography, or chemical or mechanical etching.

In general, insulative corner segment 621 at polygon vertex 605, extends along a portion of each of the two edges 620A and 620B intersecting at polygon vertex 605. Insulative corner segment 621 has a first length 621A that extends along a portion of edge 620A of second row 620, and a second length 621B that extends along a portion of edge 620B of second row 620. First length 621A may be viewed as an insulative end segment in edge 620A. Similarly, second length 621B may be viewed as an insulative end segment in edge 620B. Accordingly, insulative corner segment 611 may be viewed as insulative end segments 621A and 621B being joined at vertex 605. Electrically insulative corner segment 621 is positioned along and oriented inward of the outermost row 610 and proximate vertex 605, partially extending parallel to edges 610A and 610B, that is, each of the two sides of the outermost row 610 intersecting at vertex 605.

Insulative segment 621 is preferably substantially less conductive than conductive corner segment 611. In general, insulative corner segment 621 serves to at least partially and electrically isolate the outer side 653A of the insulating corner segment 621 from the inner side 653B of the insulating corner segment 621.

Figure 7:
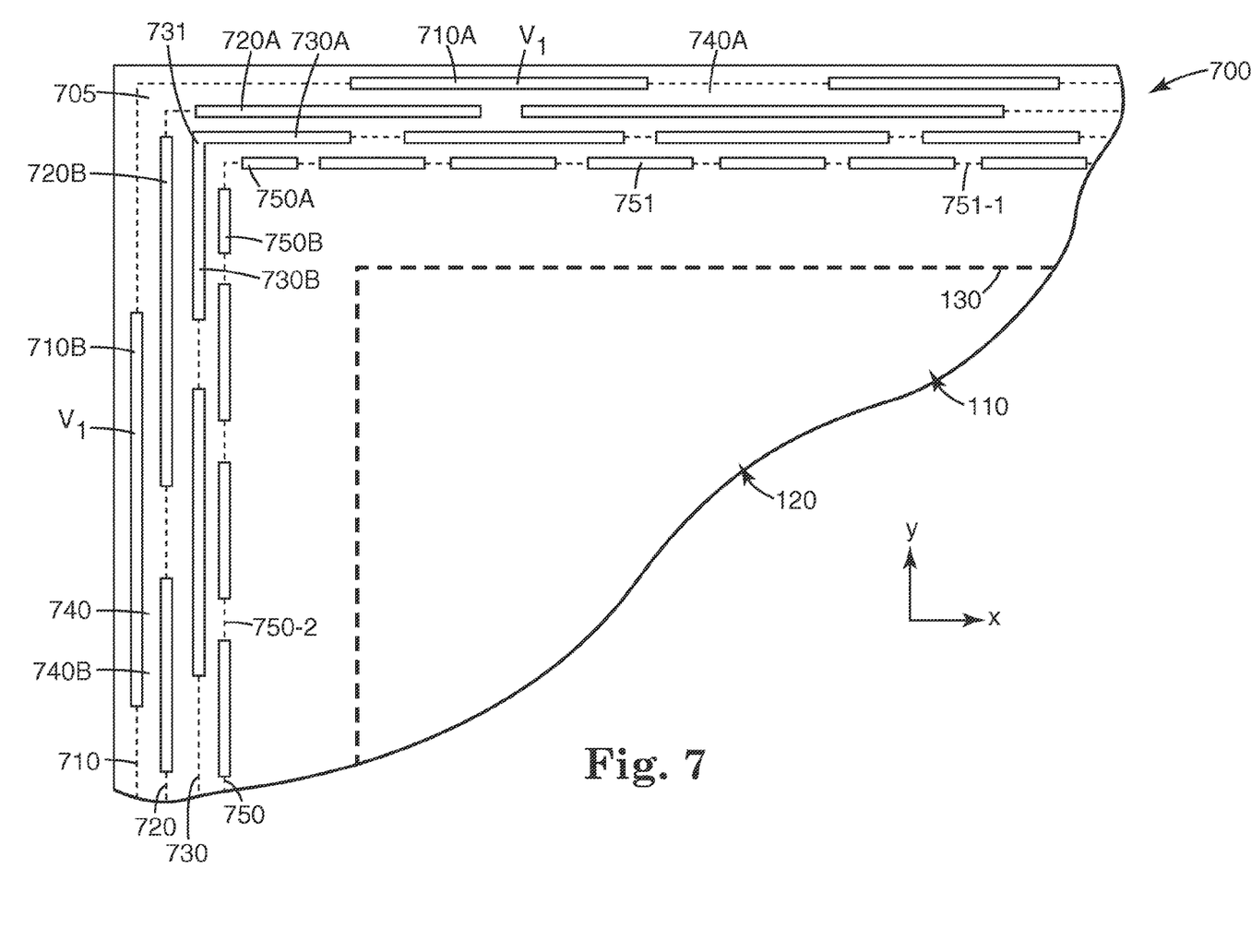
FIG. 7 illustrates a schematic top-view of a portion of a touch sensor in accordance with another embodiment of the invention.

FIG. 7 illustrates electrical isolation of the inner-side 653B of insulating corner segment 621 from the outer-side 653A of the corner segment. FIG. 7 shows three exemplary electrical paths between a point "A" located on outer side 653A of insulating corner segment 621 and a point "B" on inner side 653B of insulating corner segment 621. Path 680A goes around first length 621A of insulating corner segment 621, path 680C goes around second length 621B of insulating corner segment 621, and path 680B intersects and goes through the insulating corner segment 621. According to one embodiment of the invention, insulating corner segment 621 at least partially and electrically isolates point "A" from point "B", meaning that paths 680A and 680C are substantially more conductive than path 680B. Accordingly, most of any current that may flow from point "A" to point "B", flows through paths 680A and/or 680C, and only a small portion of any current that may flow from point "A" to point "B" flows through path 680B. Referring back to FIG. 6, insulating corner segment serves to reduce the electrical conductivity of an electrical path from corner conductive segment 611 to corner 615 of touch sensitive area 120. Accordingly, the potential at corner 615 of touch sensitive area 120 is reduced leading to a lessening of bowing in equipotential lines (see, for example, line 123A in FIG. 1) and an improvement in field linearity in touch sensitive area 120.

Referring back to FIG. 6, row 620 may further include additional resistive or insulative segments. For example, either or both segments 621-1 and 621-2 in row 620 may be electrically resistive or insulative. Furthermore, other rows of touch sensor 600 may include insulating segments, for example, insulative corner segments. According to one particular embodiment of the invention, touch sensor 600 may have an electrically insulative corner segment at one or more corners of the touch sensor. For example, touch sensor 600 may have an insulative corner segment at each corner of second row 620. Furthermore, the only segments in row 620 may be insulative corner segments.

Touch sensor 600 further includes an electrically conductive interconnect line 660 connected to resistive corner segment 611, electronics 360, and electrically conductive lead 370 for electrically connecting interconnect line 660 to electronics 360. Lead 370 may be connected directly to auxiliary electrode 660 (not shown in FIG. 6). Interconnect line 660 is preferably isolated from resistive film 110 in touch sensitive area 120.

Electronics 360 detects a location of an input touch applied to touch sensitive area 120 by applying an electrical signal to resistive corner segment 611 via electrically conductive interconnect line 660.

FIG. 7 illustrates a schematic top view of a portion of a touch sensor 700 in accordance with a preferred embodiment of the invention. For simplicity and without loss of generality, some of the elements and components discussed in reference to other embodiments of the invention (such as electronics and interconnect lines) are not shown in FIG. 7. Touch sensor 700 includes a resistive film 110 that covers a touch sensitive area 120. Touch sensitive area 120 has a perimeter 130. Touch sensor 700 further includes a linearization pattern 740 disposed on resistive film 110. Linearization pattern 740 surrounds touch sensitive area 120. Linearization pattern 340 is a polygon and has multiple sides, with every two adjacent sides intersecting at a vertex. For example, sides 740A and 740B of linearization pattern 740 intersect at a vertex 705. Linearization pattern 740 includes multiple rows of discrete conductive segments. In particular, linearization pattern 740 includes a first row of discrete conductive segments 710, a second row of discrete conductive segments 720, a third row of discrete conductive segments 730, and a fourth row of discrete conductive segments 750. Each row of linearization pattern 740 includes multiple edges, with every two adjacent edges in a row intersecting at a row vertex. For example, adjacent edges 750-1 and 750-2 of row 750 intersect at vertex 705. Furthermore, each edge of each row includes one or more middle conductive segments disposed between two end conductive segments. For example, discrete conductive segment 751 is a middle conductive segment in row 750, and discrete conductive segment 750A is an end conductive segment in the same row.

According to this preferred embodiment of the invention, conductive end segments 710A and 710B in the outermost row 710 and at vertex 705 are disjoined in row 710, meaning that the two end segments do not physically contact each other. Furthermore, conductive end segments 720A and 720B in row 720 and at vertex 705 are disjoined in row 720. Conductive end segments 730A and 730B in row 730 and at vertex 705 are joined in row 730 and form an L-shape corner segment 731 at vertex 705. Furthermore, conductive end segments 750A and 750B in row 750 and at vertex 705 are disjoined in row 750.

Touch sensitive area 120 of touch sensor 700 can be activated by applying a voltage $V_1$ directly to conductive end segments 710A and 710B (via interconnect lines not shown in FIG. 7) in the outermost row 710. A numerical simulation of touch sensor 700 resulted in a field linearity of better than 1% in the touch sensitive area.

Figure 5:
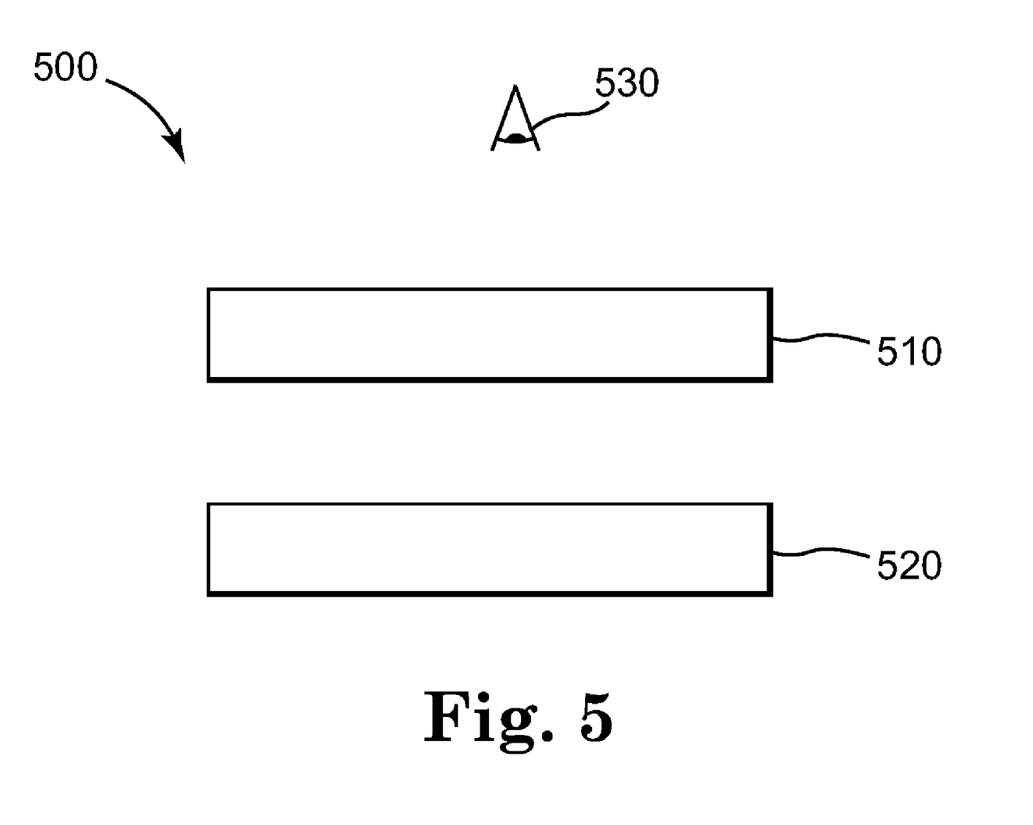
FIG. 5 illustrates a schematic side-view of an optical system in accordance with another embodiment of the invention.

FIG. 5 illustrates a schematic side-view of an optical system 500 in accordance with one particular embodiment of the invention. Optical system 500 includes a touch sensor 510 according to any embodiment of the invention, and a display 520 for displaying information to a viewing position 530. In particular, touch sensor 510 incorporates a linearization pattern (not shown in FIG. 5) according to any embodiment of the invention for linearizing the field. Touch sensor 510 may be a resistive touch sensor, a capacitive touch sensor, or it may employ any other touch sensing technology that can benefit from incorporating a linearization pattern according to any embodiment of the invention to improve field linearity. Examples of display 520 include a liquid crystal display, a cathode ray tube (CRT) display, a light emitting diode display, a plasma display, an organic light emitting display, a field emission display, an electroluminescent display, static printed display, and other suitable image forming displays. Display 520 can be graphics, text, or other indicia displaying information to the viewing position 530.

All patents, patent applications, and other publications cited above are incorporated by reference into this document as if reproduced in full. While specific examples of the invention are described in detail below to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A touch sensor comprising:
   a resistive film covering a touch sensitive area;
   at least two polygonal parallel rows surrounding the touch sensitive area including an inner row and an outermost row, the inner row comprising an electrically insulative corner segment in the resistive film at each vertex of the inner row, the outermost row comprising an electrically conductive corner segment disposed on the resistive film at each vertex of the outermost row, each corner segment at a polygon vertex extending along a portion of each of the two edges intersecting at the polygon vertex; and
   electrically conductive interconnect lines connected to the conductive corner segments for communicating signals to and from the resistive film for detecting an input touch applied to the touch sensitive area.

2. The touch sensor of claim 1 further comprising electronics configured to detect a location of the input touch by applying an electrical signal to the conductive corner segments via the electrically conductive interconnect lines.

3. The touch sensor of claim 1, wherein the electrically insulative corner segment is formed by a void in the resistive film.

4. The touch sensor of claim 3, wherein the void in the resistive film is formed by ablation or etching.

5. The touch sensor of claim 1, wherein the resistive film includes a metal oxide.

6. The touch sensor of claim 1, wherein the resistive film includes an organic conductor.

7. The touch sensor of claim 1, further comprising a conductive bar connecting segments in adjacent ones of the at least two polygonal parallel rows.

8. The touch sensor of claim 1, wherein conductive segments of the at least two polygonal parallel rows are patterned by screen printing.

9. The touch sensor of claim 1, wherein conductive segments of the at least two polygonal parallel rows are patterned by ink jet printing.

10. A touch sensor comprising:
    a resistive film covering a touch sensitive area;
    at least one polygonal parallel row of discrete conductive segments disposed on the resistive film and surrounding the touch sensitive area, each edge of each row comprising one or more middle conductive segments disposed between two end conductive segments, end conductive segments at a first vertex in the outermost row being joined at the first vertex to form a conductive corner segment; and
    an electrically insulative segment in the resistive film positioned along and oriented inward of the outermost row and proximate the first vertex, the insulating segment partially extending parallel to each of the two sides of the outermost row intersecting at the first vertex.

11. The touch sensor of claim 10 further comprising electronics configured to detect a location of an input touch applied to the touch sensitive area by applying an electrical signal to the conductive corner segment.

12. The touch sensor of claim 10, wherein the electrically insulative segment is formed by a void in the resistive film.

13. The touch sensor of claim 12, wherein the void in the resistive film is formed by ablation or etching.

14. An article comprising:
    an electrically resistive film;
    two polygonal parallel rows of discrete conductive segments disposed on the resistive film, each row having a conductive corner segment at a same vertex of the polygon, each corner segment extending along a portion of each of the two edges intersecting at the vertex; and
    an electrically insulative region formed by omitting a portion of the resistive film between the corner segments of the two rows.

15. A touch sensor comprising the article of claim 14.

16. The article of claim 14, wherein the portion of the resistive film is omitted by ablation or etching.

17. A touch sensor comprising:
    a polygonal field linearization pattern disposed on a resistive film around a touch sensitive area and having a first side and a second side intersecting at a first corner, the field linearization pattern having an inner row and an outer row of discrete conductive segments, the inner row having a conductive corner segment at the first corner, the conductive corner segment extending along a portion of the first and second sides of the linearization pattern;

one or more electrically insulative segments in the resistive film disposed so that current flowing around the conductive corner segment from the first side of the linearization pattern to the second side of the linearization pattern is substantially confined within the linearization pattern; and electronics configured to detect a location of an input touch applied to the touch sensitive area by generating an electrical current in the linearization pattern.

18. The touch sensor of claim 17, wherein the one or more electrically insulative segment are formed by voids in the resistive film.

19. The touch sensor of claim 18, wherein the voids in the resistive film are formed by ablation or etching.

* * * * *